United States Patent Office 3,019,173
Patented Jan. 30, 1962

3,019,173
METHOD FOR PREPARING TETRACYCLINE
Masao Arishima, Nakano-ku, Tokyo, and Yasuharu Sekizawa, Shibuya-ku, Tokyo, Japan, assignors to American Cyanamid Company, New York, N.Y., a corporation of Maine
No Drawing. Filed June 4, 1956, Ser. No. 589,004
11 Claims. (Cl. 195—80)

This invention relates to the manufacture of tetracycline and more particularly to the production of tetracycline by microorganisms which also tend to form chlortetracycline in fermentation media containing chlorides.

Recently it has been discovered that microorganisms of the genus Streptomyces which produce chlortetracycline will also produce tetracycline, particularly if the chloride ion concentration of the fermentation medium is kept low. This can be done by providing fermentation media from which chloride ions are excluded, either by making up the fermentation medium with chloride-free components or by treating the medium with agents which remove or sequester the chloride ions, thus making them unavailable for the formation of chlortetracycline.

Unfortunately some of the most effective components of fermentation media for the production of the tetracycline antibiotics contain substantial quantities of chloride ions. Corn steep liquor is one of the most effective nutrient substances for the production of the tetracycline antibiotics as well as many other antibiotics. Apparently, this natural material contains something that is especially desired by the fermenting microorganism. Highest yields of antibiotic are, therefore, obtained when a portion of corn steep liquor is included in the aqueous nutrient medium. Corn steep liquor contains substantial amounts of chloride ions, however, and if formation of chlortetracycline is to be kept at reasonably low levels, it has heretofore been considered necessary to reduce the chloride content of this material. The same applies to a number of other naturally occurring nutrient materials which are advantageously used in the fermentation process.

Several means of reducing the chloride ion content of aqueous nutrient solutions for tetracycline production have been suggested. Precipitation of the chloride ion as silver chloride is a very effective means of reducing the chloride ion content. However, this is an expensive process requiring the use of expensive raw materials, special equipment, and a toxic gas, hydrogen sulfide, for recovery of silver.

Ion exchange resins have also been suggested to reduce the chloride ion content of fermentation media. These substances tend to remove some salts and organic substances of unidentified composition which are desirable components of the fermentation media. As a result, low yields of antibiotic may be obtained when using nutrient solutions which have been pre-treated with ion exchange resins to remove chloride ions.

The chloride deprivation systems still leave much to be desired, however, because of the capital investment required, the relatively complicated means of removing chloride ions from the fermentation medium, as well as the fact that the fermentation medium can in such instances be composed only of those raw materials from which chloride ions can be easily removed or which are naturally low in chlorides.

It has also been proposed to shift the equilibrium in a tetracycline-chlortetracycline fermentation by the use of bromide ions which apparently represses chlortetracycline formation in some respects.

The present invention depends for its effectiveness in producing high yields of tetracycline in a fermentation medium in which it is not necessary to remove chloride ions from the system. The present invention is based upon the discovery that when a chlorination inhibitor as hereinafter described is added to a chloride containing fermentation, the activities of the organism are directed from the synthesis of chlortetracycline to the synthesis of tetracycline. The invention is of extreme practical importance because it obviates the expense and disadvantages of removing chloride ions from the fermentation medium. Thus, in accordance with the present invention a chloride-containing, chlortetracycline fermentation can be easily converted to a tetracycline fermentation by the addition to the nutrient medium of a relatively small amount of a chlorination inhibitor as hereinafter described.

The present invention is not particularly concerned with any specific microorganisms except to the extent that it is concerned with those that produce both chlortetracycline and tetracycline by fermentative biosynthesis. Insofar as we are presently aware all such microorganisms are of the genus Streptomyces. The species Streptomyces aureofaciens, (NRRL 2209), first isolated and described by D, Duggar U.S. Patent 2,482,055, produces chlortetracycline in fermentation media in which chloride ions are present. This species, and its numerous natural and induced mutants, will also produce tetracycline when deprived of chloride ions. A number of other tetracycline producing microorganisms have been mentioned in the patent literature as alleged distinct species and among these may be mentioned S. viridifaciens, (ATCC 11989) and still others. The published morphological data on these microorganisms is insufficient to conclusively determine whether or not they are new species or merely strains of S. aureofaciens. Regardless of this, however, the invention is not predicated upon the selection of a particular species but, as indicated above, of controlling and reducing the proportion of chlortetracycline that is produced by these microorganisms in fermentation media containing chloride ions.

The various substances that may be employed in accordance with the process of the present invention to inhibit the formation of chlortetracycline, yet permit the production of tetracycline during the fermentation are five and six-membered heterocyclic compounds having the following common structure:

$$\begin{array}{c} C-N \\ | \\ C=X \\ | \\ Y \end{array}$$

In this grouping the symbol X represents S, SH, SR, $NH_2$, NHR and NRR in which R is a metal, alkyl, benzyl, phenyl or other aryl radical, or other substituent such as

  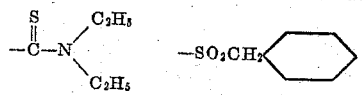

and the like, and Y represents a sulfur, oxygen or nitrogen atom. The remainder of the ring structure may be made up of a number of different elements so that a very large number of different types and kinds of chemical substances are covered. Many of these will be specifically mentioned hereinafter. The principal consideration is that the particular grouping of carbon, nitrogen and carbon substituted with a sulfur atom and with another sulfur, nitrogen or oxygen atom is involved.

The remainder of the ring not shown may be simply a carbon atom as in the case of 2-mercaptothiazole, 2-mercaptoimidazole and 2-mercaptooxazoline. The ring can be saturated or unsaturated. The carbon atom may have various substituents such as oxygen, as in the case of 2-thiohydantoin. The remainder of the ring may also contain 2 carbon atoms as would be the case of 2-thiouracil, 2-mercaptopyrimidine, and these may also be substituted with a variety of substituents as in the case of 2-thiobarbital.

The remainder of the ring may contain atoms other than carbon as in the case of trithiocyanuric acid and many others. Among the numerous compounds which may be used in practicing the invention, in addition to those named above, include:

2-mercaptothiazoline
2-amino-5-nitrothiazole
Rhodanine
5-imino-1,2,4-dithiazolidine-3-thione
1-methyl-2-mercaptoimidazole
2-imidazolidinethione
2-mercapto-4-carboxy-2-thiazoline
1,3,5-triazine-2-anilino-4,6-dithiol
1,3,5-triazine-2,4,6-trithiol mono iron salt
1,3,5-triazine-2,4,6-trithiol mono zinc salt
1,3,5-triazine-2,4,6-trithiol mono copper salt
1,3,5-triazine-6-amino-2,4-dithiol mono potassium salt
2-thio-4,6-diamino-1,3,5-thiadiazine
2-thiouracil
5-cyano-2-thiouracil
6-methyl-2-thiouracil
1-benzyl-2-thiouracil
4,5-diamino-2-thiouracil
4,6-dimethyl-2-thiouracil
4-amino-2-thiopyrimidine
Hexahydro-2-thiopyrimidine
2-mercapto-4,6,6-trimethylthiazine
Sodium-5-ethyl-5-methylbutyl-2-thiobarbiturate A particularly useful group of compounds which may be used in practicing the invention are those related to benzomercaptothiazole and have the following general structure:

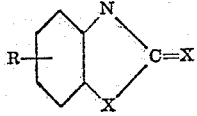

in which X is as defined above and R represents one or more substituents on any of the available positions of the benzene ring. Such substituent groups include hydrogen, methyl, ethyl, nitro, amino, alkylamino, acylamino, benyl and substituents forming a fused ring such as in the case of 2-mercaptonaphthothiazole.

These compounds may also be used in their bis form as follows:

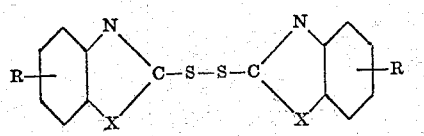

The conditions of the fermentation are generally the same as for presently known methods of producing tetracycline or chlortetracycline by fermentation. That is, the fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, ammonium sulfate, urea, corn steep liquor, distillers solubles, fish meal and other conventional substances. The inorganic salts include such things as calcium carbonate, ammonium sulfate, ammonium chloride, sodium dihydrogen phosphate, and the various trace elements such as manganese, cobalt, zinc, copper, iron, and the like.

The other general conditions of the fermentation, such as hydrogen ion concentration, temperature, time, rate of aeration, preparation of the inoculum, sterilization, inoculation and the like are conventional and may be similar to those shown in the U.S. patent to Duggar, 2,482,055, and other subsequent patents which describe the production of chlortetracycline and tetracycline.

Similarly, the recovery of the tetracycline from the fermentation liquor is conventional and need not be described, as numerous methods of recovering tetracycline from fermentation liquors have been published.

As in the case of the use of bromide ions in depressing fermentation chlorination the inhibitors of the present invention may be somewhat toxic to the fermentation, especially when used in high concentrations. Fortunately, very small amounts of the inhibitors of this invention depress the formation of chlortetracycline very markedly. As little as one part per million shows some effect. Ordinarily the preferred ranges will be from about five parts per million to 500 parts per million. Generally speaking the more inhibitor that is added, the less chlortetracycline will be produced. On the other hand as continued amounts of the inhibitor are added the toxic effects begin to exert themselves and the total yield of antibiotic is reduced. These effects will be apparent from examples which follow.

A further important aspect of the invention involves the use of the inhibitors described above with bromide ions in preventing the formation of chlortetracycline in a chloride-rich medium. In this way it is possible to almost completely eliminate the toxic effects of both the bromide ion and the inhibitors of the present invention, in many cases. This effect will also be apparent from the examples which follow. Besides reducing toxic effects, it is possible to obtain very good results with much less bromide ion than would be necessary without using it in conjunction with the inhibitors of the present invention. Accordingly the bromide ion may be used in amounts ranging from as little as 0.005 to about 2% by weight, preferably in the order of 0.02 to 1%.

In order that the invention may be described in greater particularity a number of examples will be given to illustrate some of the more important aspects of it. It will be understood, of course, that these are merely examples of some preferred inhibitors and are intended to illustrate some of the effects that may be obtained under varying conditions. Many other inhibitors of the kind named above may be used with similar results and the invention is not to be construed as being limited to these examples.

EXAMPLE 1

Fifty ml. of culture medium (pH 7.2) containing 2.8% of starch, 0.2% of molasses, 3% of defatted powdered peanuts, 0.5% of dry yeast, 0.4% of calcium carbonate, 0.8% of sodium bromide, 0.0007% of $MnSO_4.7H_2O$ and 0.003% of $ZnSO_4.7H_2O$ was put in culture flasks (500 ml. capacity) and, after addition of the sulfur compounds shown in the table, sterilized by heating at 120° C. for five minutes under increased pressure. After cooling the medium in each flask was inoculated with 1 ml. of a seed culture of *Streptomyces sayamaensis*, and subjected to aerobic fermentation with shaking (frequency, 146 per min.; amplitude, 10 cm.) for 72 hours. After this time the culture broth in each flask is at pH 6.3–7.8 and shows maximum antibiotic activity. The tertacycline produced therein is then determined with the following results:

Table I

| Compound | Addition level, p.p.m. | Total Tetracyline | Percent Tretracycline |
|---|---|---|---|
| Control (without Sodium Bromide) | 0 | 2,200 | 5-10 |
| Control (with Sodium Bromide) | 80 | 1,890 | 80 |
| 2-Mercaptoimidazole | 80 | 1,540 | Over 99 |
| 2-Thiouracil | 80 | 1,320 | 98 |
| 2-Mercaptopyrimidine | 80 | 1,490 | Over 99 |
| 2-Thiobarbituric acid | 80 | 1,410 | 98 |
| 2-Mercaptothiazole | 80 | 1,520 | 98 |
| 2-Aminothiazole | 80 | 1,410 | 98 |
| 2-Mercaptothiazoline | 80 | 1,500 | 98 |
| 2-Mercaptooxazoline | 80 | 1,430 | 98 |
| 2-Thiohydantoin | 80 | 1,500 | 98 |

EXAMPLE 2

A fermentation medium composed of the following substances was prepared:

Corn flour ------------------------grams per liter-- 14.5
Starch --------------------------------do---- 47
Corn steep liquor ---------------------do---- 25
$CaCO_3$ ------------------------------do---- 9
$(NH_4)_2SO_4$ ------------------------do---- 5.6
$MnSO_4$(70%) -------------milligrams per liter-- 80
$CoCl_2 \cdot 6H_2O$ ------------------do---- 5
Lard oil ---------------------percent by volume-- .3
Ammonium chloride ----------grams per liter-- 1.7

To portions of this medium were added varying amounts of 2-mercaptobenzothiazole in one series and to a similar series there was added in addition 400 parts per million of bromide ion as KBr. The media were dispensed in appropriate amounts into flasks, sterilized, inoculated with vegetative inoculum of S. aureofaciens (strain S77) and incubated at 26.5° C. on a rotary shaker for 96 hours. They were then assayed for their chlortetracycline and tetracycline contents. The results are presented in the table below.

Table II

| Compound | Addition level, p.p.m. | Bromide ion, p.p.m. | Gamma/ml. Chlortetracycline | Gamma/ml. Tetracycline |
|---|---|---|---|---|
| Control | 0 | 0 | 7,900 | 930 |
| 2-Mercaptobenzothiazole | 10 | 0 | 962 | 5,780 |
|  | 20 | 0 | 345 | 6,060 |
|  | 50 | 0 | 135 | 5,160 |
| Control | 0 | 400 | 6,050 | 1,790 |
| 2-Mercaptobenzothiazole | 10 | 400 | 275 | 6,620 |
|  | 20 | 400 | 110 | 5,160 |
|  | 50 | 400 | 105 | 5,380 |

As will be seen from the above results very small amounts of the inhibitor drastically reduced the amount of chlortetracycline that was formed and permitted the microorganism to produce large amounts of tetracycline. The results also show the advantage of using the organic inhibitors of the present invention with bromide ions. Superior results are obtained when both are used together.

EXAMPLE 3

A chlortetracycline fermentation medium such as shown in Example 2 was prepared. To this medium were added varying amounts of rhodanine, and the fermentation was conducted as before. The results of this series of tests are shown in the following table:

Table III

| Compound | Addition level, p.p.m. | Gamma/ml. Chlortetracycline | Gamma/ml. Tetracycline |
|---|---|---|---|
| Control | 0 | 6,670 | 850 |
| Rhodanine | 100 | 1,575 | 5,340 |
|  | 200 | 445 | 5,410 |
|  | 400 | 160 | 4,760 |

EXAMPLE 4

A chlortetracycline fermentation medium such as shown in Example 2 was prepared. To this medium were added varying amounts of trithiocyanuric acid, and the fermentation was conducted as before. The results of this series of tests are shown in the following table:

Table IV

| Compound | Addition level, p.p.m. | Gamma/ml. Chlortetracycline | Gamma/ml. Tetracycline |
|---|---|---|---|
| Control | 0 | 6,670 | 850 |
| Trithiocyanuric acid | 100 | 1,050 | 4,920 |
|  | 200 | 545 | 4,770 |
|  | 400 | 75 | 2,070 |

EXAMPLE 5

A chlortetracycline fermentation medium such as shown in Example 2 was prepared. To this medium were added varying amounts of benzoxazolethiol (or 2-mercaptobenzoxazole), and the fermentation was conducted as before. The result of this series of tests are shown in the following table:

Table V

| Compound | Addition level, p.p.m. | Gamma/ml. Chlortetracycline | Gamma/ml. Tetracycline |
|---|---|---|---|
| Control | 0 | 7,350 | 575 |
| 2-benzoxazolethiol | 5 | 200 | 4,275 |
|  | 10 | 120 | 3,010 |
|  | 25 | 70 | 642 |

EXAMPLE 6

A chlortetracycline fermentation medium such as shown in Example 2 was prepared. To this medium were added varying amounts of 2,2-dithiobisbenzothiazole, and the fermentation was conducted as before. The results of this series of tests are shown in the following table:

Table VI

| Compound | Addition level, p.p.m. | Gamma/ml. Chlortetracycline | Gamma/ml. Tetracycline |
|---|---|---|---|
| Control | 0 | 7,800 | 725 |
| 2,2-dithiobisbenzothiazole | 25 | 375 | 5,565 |
|  | 50 | 80 | 2,050 |

Many other organic compounds having the general formula described above and including those specifically named give similar results to those shown in the above examples. It will be understood, of course, that some of these inhibitors are more effective than others. Also the relative proportions of chlortetracycline and tetracycline at the end of the fermentation will depend upon a number of factors including the strain of microorganism that is used as the fermenting agent. Apparently some strains produce less chlortetracycline than others with a given inhibitor. Also the amount of chloride ion in the fermentation medium will effect the ratios of the antibiotics. Obviously the less chloride ion in the medium the less chlortetracycline can be produced. The medium used in Examples 2 to 6 was a chloride rich medium and as expected it was capable of producing large amounts of chlortetracycline. Normally in practicing the invention the chloride ion content of the medium should be kept as low as possible commensurate with the obtaining of a high yield of tetracycline. Low chloride ion media have not yet been found favorable for the production of high yields of antibiotic and the inhibitors of the present invention are particularly useful in cases where the fermentation medium contains more than about ten parts per million of chloride ions.

We claim:
1. In a process of preparing tetracycline by aerobic fermentation of an aqueous fermentation medium with microorganisms of the Streptomyces genus which produce chlortetracycline when chlorides are present the improvement which comprises the step of adding from about 5 to 500 parts per million of an organic compound which inhibits the formation of chlortetracycline said organic compound being selected from the group consisting of those five and six-membered heterocyclic compounds having the structure:

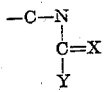

wherein X is a member of the group consisting of S, SH, SR, $NH_2$, NHR and NRR in which R is a member of the group consisting of a metal, alkyl, benzyl, phenyl and substituted phenyl radicals and wherein Y is a member of the group consisting of sulfur, oxygen and nitrogen.

2. In a process of preparing tetracycline by aerobic fermentation of an aqueous fermentation medium with strains of *Streptomyces aureofaciens* which produce chlortetracycline when chlorides are present the improvement which comprises the step of adding from about 5 to 500 parts per million of an organic compound of the group consisting of those five and six-membered heterocyclic compounds having the structure:

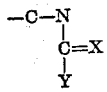

wherein X is a member of the group consisting of S, SH, SR, $NH_2$, NHR and NRR in which R is a member of the group consisting of a metal, alkyl, benzyl, phenyl and substituted phenyl radicals and wherein Y is a member of the group consisting of sulfur, oxygen and nitrogen.

3. A process in accordance with claim 2 in which the organic inhibitor is 2-mercaptobenzothiazole.

4. A process in accordance with claim 2 in which the organic inhibitor is 2-thiouracil.

5. A process in accordance with claim 2 in which the organic inhibitor is 2-benzoxazolethiol.

6. A process in accordance with claim 2 in which the organic inhibitor is 2,2-dithiobisbenzothiazole.

7. A process in accordance with claim 2 in which the organic inhibitor is 2-benzothiazyl-N,N-diethylthiocarbamyl sulfide.

8. A process in accordance with claim 2 in which the fermentation medium also contains from about 0.005% to 2.0% by weight of bromide ions.

9. In a process of aerobic fermentation of a nutrient medium with a microorganism of the genus Streptomyces, said fermentation normally producing an antibiotic consisting substantially of chlortetracycline with minor amounts of tetracycline, the improvement comprising suppressing the production of chlortetracycline in favor of tetracycline by the addition of 2-mercaptobenzoxazole to the fermentation medium in an amount effective to effect such suppression.

10. In a process for producing tetracycline by aerobic fermentation with a chlortetracycline-producing microorganism of the genus Streptomyces, the improvement which comprises conducting the fermentation in the presence of 2,2'-dithiobis[benzothiazole].

11. In a process of aerobic fermentation of a nutrient medium with a microorganism of the genus Streptomyces, said fermentation normally producing an antibiotic consisting substantially of chlortetracycline with minor amounts of tetracycline, the improvement comprising suppressing the production of chlortetracycline in favor of tetracycline by the addition of 2-mercaptothiazole to the fermentation medium in an amount effective to effect such suppression.

References Cited in the file of this patent
UNITED STATES PATENTS

| 2,712,517 | Guorevitch et al. | July 5, 1955 |
| 2,734,018 | Minieri et al. | Feb. 7, 1956 |
| 2,739,924 | Lein et al. | Mar. 27, 1956 |
| 2,763,591 | Hatch et al. | Sept. 18, 1956 |

FOREIGN PATENTS

| 316,291 | Switzerland | Nov. 15, 1956 |

OTHER REFERENCES

Sekizawa: Jour. of Biochemistry, vol. 42, No. 2, pages 217–219.

N.Y. Acad. Sci., vol. 60, Art. 1, pages 71–101.

Martell et al.: Chemistry of the Metal Chelate Compounds, Prentice-Hall, Inc., 1952, pages 135–149, 471, 503.

Gourevitch et al.: Antibiotics and Chemotherapy, volume V, No. 8, August 1955, pages 448–452.